Figure 3:
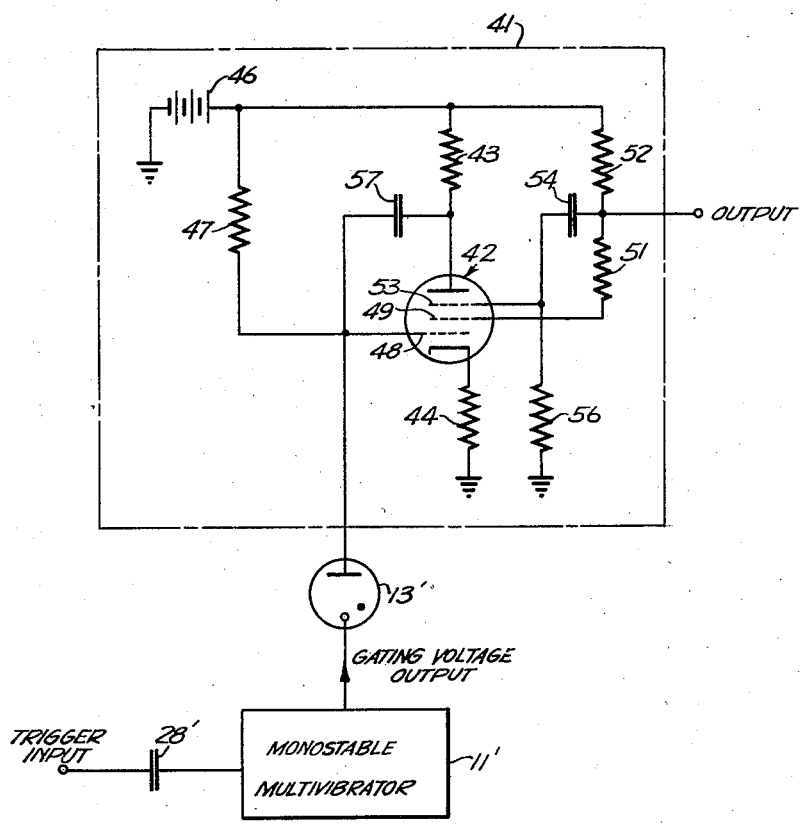

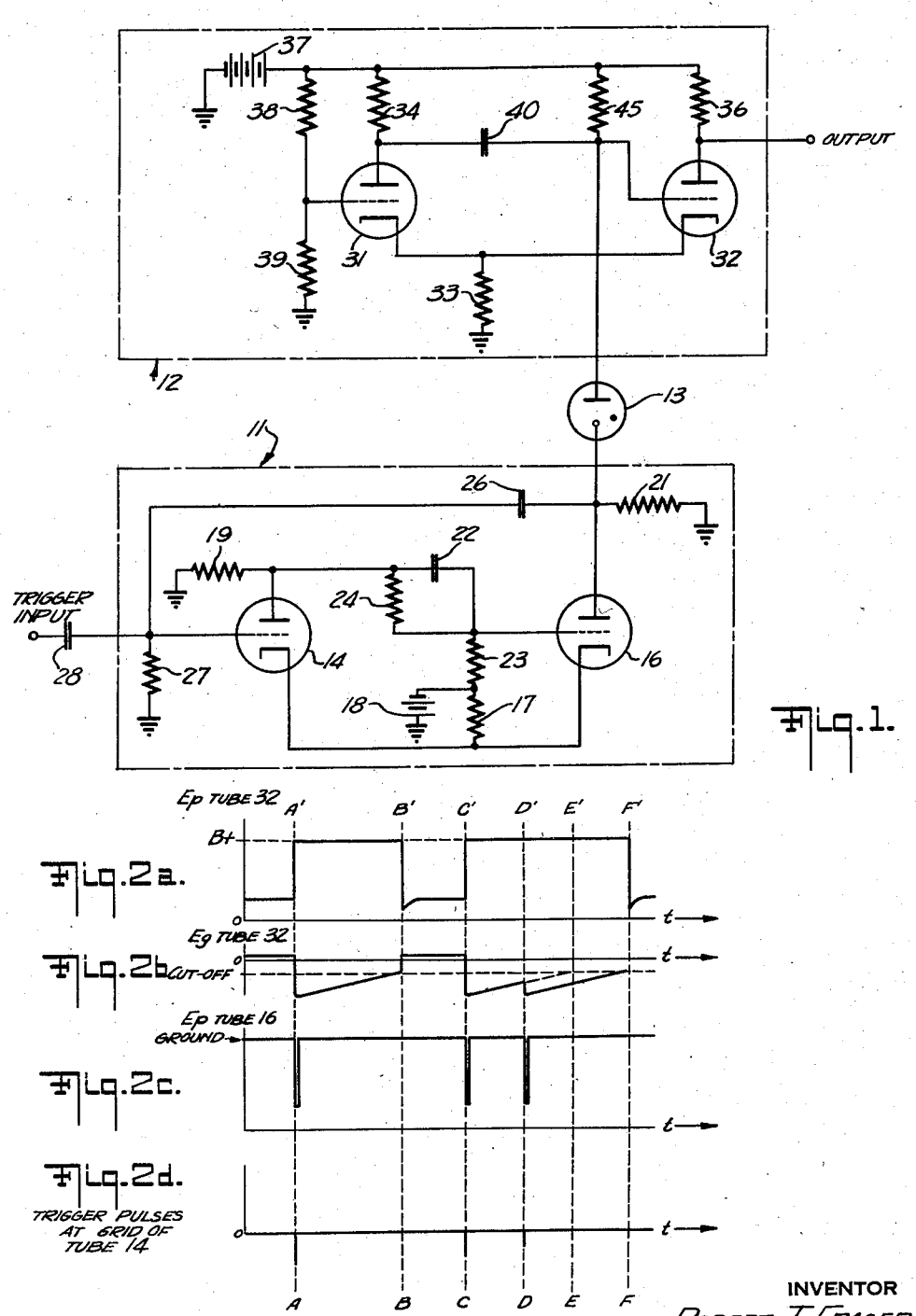

INVENTOR
ROBERT T. FRASER
BY
ATTORNEY

United States Patent Office 2,863,052
Patented Dec. 2, 1958

2,863,052

ELECTRONIC PULSE TIMING SYSTEM

Robert T. Fraser, Huntington Station, N. Y., assignor to Sperry Rand Corporation, a corporation of Delaware Application September 24, 1954, Serial No. 458,236

13 Claims. (Cl. 250—27)

The present invention relates to electronic pulse timing systems.

More specifically, this invention relates to a triggered timing system which, upon the application of a single trigger pulse of proper polarity, will provide a D.-C. output voltage pulse of desired magnitude having a predetermined time duration measured from the leading edge of the trigger pulse. Upon reception of a second trigger pulse having the same polarity as the first, the second pulse recurring before the expiration of the aforementioned output voltage pulse and after a brief interval of time has elapsed from the time the first pulse was received, the timing of the system is automatically reset. Hence, the D.-C. output voltage pulse will not terminate until after the aforementioned time duration has elapsed as measured from the leading edge of the second trigger pulse. Therefore, any received trigger pulse of proper polarity causes the timing system to provide or maintain a predetermined D.-C. output voltage pulse for a predetermined length of time measured from the leading edge of the last trigger pulse received by the system.

The timing system of the present invention is capable, for example, of providing an output voltage which will maintain an oscillator in continuous operation in response to a series of recurrent pulses of predetermined polarity having a repetition time shorter than the timing cycle of the system. It is also capable of cutting off the oscillator after a highly accurate time interval measured from the time of reception of the last trigger pulse received, this time interval being independent of the amplitude and/or width of the trigger pulse.

It is, therefore, an object of the present invention to provide a pulse timing system which is triggered by the leading edge of a trigger pulse of proper polarity supplied thereto for providing a predetermined output voltage of extremely accurate duration.

It is a further object of the present invention to provide a pulse timing system which is triggered by the leading edge of a trigger pulse of predetermined polarity and which is automatically reset by a further trigger pulse of the same polarity supplied during a cycle of operation initiated by the first trigger pulse to accurately start the timing cycle over again.

The foregoing and other objects and advantages of the present invention are attained by a system which comprises a first pulse generating means, a second pulse generating means, and unidirectional coupling means therebetween. The unidirectional coupling means is adapted to normally isolate the two generating means from each other during quiescence of the first generating means.

The first generating means is responsive to a trigger pulse of proper polarity to provide a narrow gating voltage for causing the unidirectional coupling means to be conductive. This triggers the second generating means to provide a D.-C. output voltage of predetermined duration measured from the leading edge of the trigger pulse supplied to the first generating means.

If a timing circuit in the first generating means has a short time constant relative to a timing circuit in the second generating means, a second or succeeding trigger pulse received after termination of the gating voltage provided by the first generating means but before the termination of the output voltage provided by the second generating means will cause a second gating voltage to be provided. The second gating voltage again causes conduction of the unidirectional coupling means and recycling of a timing voltage waveform provided in the timing circuit of the second generating means. Thus, the D.-C. output voltage from the timing system at the output of the second generating means will always be maintained for a predetermined duration measured from the leading edge of the last received trigger pulse supplied to the first generating means.

In the drawings, Fig. 1 is a schematic circuit diagram of a first pulse timing system in accordance with the present invention;

Figs. 2a–2d are views of various voltage waveforms established between various points in the system shown in Fig. 1 during operation thereof; and Fig. 3 is a schematic circuit diagram of a further pulse timing circuit system in accordance with the present invention.

Referring to Fig. 1, a timing system in accordance with a first embodiment of the invention comprises a first pulse generating means comprising a primary multivibrator 11, a second pulse generating means comprising a secondary multivibrator 12 and a unidirectional coupling means comprising a gaseous diode regulator tube 13 connected therebetween. Multivibrators 11 and 12 are adapted to be monostable in operation, i. e. each multivibrator has a quasi-stable operating state followed by a single stable operating state in response to an input trigger pulse of proper polarity applied thereto. Regulator tube 13 is adapted to effectively isolate the multivibrators 11 and 12 from each other when multivibrator 11 is operating in a stable state.

The primary multivibrator 11 includes a triode vacuum tube 14 and a similar triode vacuum tube 16 having their cathodes coupled together. The tubes 14 and 16 could be in separate evacuated envelopes or they could be within a single envelope and comprise a twin-triode arrangement if desired.

The cathodes of the tubes 14 and 16 are coupled through a resistor 17 to a negative terminal of a suitable source of operating potential such as battery 18. The positive terminal of the battery 18 is grounded as illustrated.

A load resistor 19 is coupled between the plate of tube 14 and ground. Similarly, a load resistor 21 is coupled between the plate of tube 16 and ground.

The plate of tube 14 is coupled to the grid of tube 16 by a coupling circuit comprising series coupling capacitor 22 and shunt resistor 23, the terminal of resistor 23 farthest from capacitor 22 being connected to the negative terminal of battery 18. The terminals of capacitor 22 are shunted by a resistor 24 having a large value of resistance.

The plate of tube 16 is coupled to the grid of tube 14 through a timing circuit comprising a series capacitor 26 and a shunt resistor 27 having a large value of resistance. The junction point between capacitor 26 and resistor 27 is connected to the grid of tube 14 and to an input coupling capacitor 28. The terminal of resistor 27 farthest from this junction is grounded as illustrated in Fig. 1.

During the stable operating state of the primary multivibrator 11 the tube 14 is conducting and tube 16 is non-conducting. Tube 14 conducts because its grid potential is positive whereas the grid potential of tube 16 is negative when the circuit 11 is energized by battery 18. With current flowing through the tube 14 and cathode resistor 17 the tube 16 is held non-conducting. This occurs since the grid to cathode voltage of tube 16 is made sufficiently negative to bias tube 16 below cut-off, current through resistor 17 providing a larger voltage drop than that provided by current through resistor 23.

The secondary multivibrator 12 comprises a triode vacuum tube 31 and a similar triode vacuum tube 32 having their cathodes coupled together. The tubes 31 and 32 could also be in separate evacuated envelopes or they could be within a single envelope and comprise a twin-triode arrangement, if desired.

The cathodes of tubes 31 and 32 are coupled through a resistor 33 to ground. The plates of tubes 31 and 32 are coupled through load resistors 34 and 36, respectively, to a positive terminal of a suitable source of operating potential such as battery 37, the negative terminal of battery 37 being grounded.

The grid of tube 31 is coupled to a point between two resistors 38 and 39 connected between ground and the positive terminal of battery 37. The values of resistors 38 and 39 are related so that the voltage at the grid of tube 31 is negative with respect to the voltage at the cathode of tube 31 when tube 32 is conducting.

A series capacitor 40 is coupled between the plate of tube 31 and the grid of tube 32. A shunt resistor 45 is coupled between the grid of tube 32 and the positive terminal of battery 37. The capacitor 40 and resistor 45 comprise a timing circuit for supplying a timing voltage waveform to the grid of tube 32 when tube 31 is made conductive. This timing voltage waveform is adapted to bias tube 32 below cut-off for a predetermined duration of time depending primarily on the R-C time constant of resistor 45 and capacitor 40.

When the secondary multivibrator 12 is energized by battery 37 and the tube 32 begins to conduct, the current flow through tube 32 and cathode resistor 33 causes the cathode-to-ground potential of tube 31 to be sufficiently positive with respect to the grid-to-ground potential of tube 31, so that tube 31 is biased well below cut-off. When tube 32 is conducting and tube 31 is non-conducting the multivibrator 12 is in a stable operating state.

During the stable operating state of primary multivibrator 11 the plate of tube 16 is effectively at ground potential, tube 16 being non-conducting at this time. During the stable operating state of secondary multivibrator 12 the potential at the grid of tube 32 is positive with respect to ground and substantially the same as the potential across cathode resistor 33, tube 32 being conductive at this time with grid current flowing through resistor 45. The gaseous diode regulator tube 13 is chosen so that the difference in potential between the points at the grid of tube 32 and the plate of tube 16 is insufficient to cause ionization and conduction of tube 13 during stable state operation of the primary multivibrator 11.

To more fully explain the operation of multivibrators 11 and 12 when triggered, reference should be made to Figs. 2a-2d. These figures are illustrative of a plurality of voltage waveforms between various points in the multivibrators 11 and 12 as functions of time along synchronized time axes during stable and quasi-stable operation of multivibrators 11 and 12.

Fig. 2a indicates the plate to ground voltage of tube 32; Fig. 2b indicates the grid to cathode voltage of tube 32; Fig. 2c indicates the plate to ground voltage of tube 16; and Fig. 2d indicates the trigger voltage pulses supplied to the grid of tube 14 through coupling capacitor 28. The voltages between the aligned zero time references at the ordinates in Fig. 2a through Fig. 2d and a time indicated by the vertical line A—A' are indicative of the quiescent voltages of multivibrators 11 and 12 at the aforementioned points during their stable operating states.

If a negative trigger pulse as shown in Fig. 2d at a time indicated by vertical dashed line A—A' is supplied to the grid of tube 14, the pulse is inverted at the plate of tube 14 and a positive pulse is supplied to the grid of tube 16 through the coupling capacitor 22. This positive pulse at the grid of tube 16 coupled with the accompanying decreased flow of current through tube 14 and cathode resistor 17 causes the bias voltage at the grid of tube 16 to be above cut-off so that tube 16 starts conducting. The decrease in plate voltage of tube 16 is fed back to the grid of tube 14 through capacitor 26 and resistor 27 to cause tube 14 to stop conducting and tube 16 to become conductive. At this time the multivibrator 11 functions in a quasi-stable operating state.

When tube 16 is conducting, the voltage at its plate is negative with respect to ground as shown at line A—A' in Fig. 2c and the voltage at the grid of tube 14 is negative with respect to what it is during the quiescent or stable operating state of multivibrator 11. The voltage at the grid of tube 14 goes negative since the voltage across capacitor 26 cannot change instantaneously with the change in plate voltage of tube 16. The negative going voltage at the end of tube 14 drives this tube below cut-off. The multivibrator 11 stays in the quasi-stable operating state with tube 14 non-conducting and tube 16 conducting until the capacitor 26 is sufficiently discharged through resistor 27 to raise the voltage at the grid of tube 14 above cut-off.

When tube 14 begins to conduct again the resulting voltage drop at the plate of tube 14 is supplied to the grid of tube 16 through capacitor 22. This plus the rise in cathode voltage of tubes 14 and 16 due to increased current flow through resistor 17 causes the tube 16 to become cut-off, thus restoring multivibrator 11 to its stable operating state. The duration of the negative going plate voltage of tube 16 during quasi-stable operation is determined primarily by the time constant of capacitor 26 and resistor 27, and is independent of the width and/or amplitude of a trigger pulse supplied to the grid of tube 14.

When tube 16 of the primary multivibrator 11 is made conductive the drop in its plate voltage should be sufficient to cause the potential across the gas tube regulator 13 between its plate and cathode to be well above the ionization potential for the regulator. Thus, the regulator tube 13 will ionize and become conductive, the capacitor 40 of the secondary multivibrator 12 changing its quiescent charge by virtue of a flow of capacitor current through resistor 34, regulator tube 13, tube 16 and its plate and cathode circuits.

Ionization of regulator tube 13 causes the grid voltage of tube 32 of multivibrator 12 to become sufficiently negative so that tube 32 can no longer conduct. The resulting decreased current flow through cathode resistor 33 decreases the cathode voltage of tube 31 so that the tube 31 will begin to conduct. Thus, the narrow gating voltage provided at the plate of tube 16 of multivibrator 11 causes the operation of multivibrator 12 to change from a stable to a quasi-stable operating state.

The grid to cathode potential of tube 32 is shown in Fib. 2b. When tube 13 becomes ionized at the time indicated by the dashed line A—A' the grid voltage of tube 32 drops to a large negative value well below cut-off for the tube. At the end of the negative gating pulse at the plate of tube 16 the potential across regulator tube 13 will be incorrect to maintain tube 13 in an ionized state. Therefore, regulator tube 13 can no longer conduct and the capacitor 40 begins to recharge through resistor 45 to the difference between the voltage of battery 37 and the plate voltage of tube 31 when conducting, thus providing a timing voltage waveform for multivibrator 12. Before the recharging of capacitor 40 can be complete, the cut-off bias for tube 32 is reached and this tube begins to conduct. This occurs at the time indicated by dashed line B—B'. The resulting increased flow of current through cathode resistor 33 raises the cathode potential of tube 31 to cut this tube off. Therefore, the multivibrator 12 is restored to its stable operating state and the positive D.-C. voltage pulse at the plate of tube 32 is terminated at the time indicated by the dashed line B—B' as is shown in Fig. 2a.

The width of the positive pulse at the plate of tube 32 of the secondary multivibrator 12 is determined by the quasi-stable operating time of primary multivibrator 11 and the R-C time constant of resistor 45 and capacitor 40 in the secondary multivibrator 12. If another negative trigger pulse at a time indicated by dashed line C—C' in Figs. 2a–2d arrives at the grid of tube 14 after the multivibrators 11 and 12 are restored to their stable operating states, the multivibrators respond the same as before.

If a further negative trigger pulse is received after multivibrator 11 returns to its stable operating state and at any time before the time indicated by line E—E' when multivibrator 12 would ordinarily return to its stable operating state, the further trigger pulse being received at a time indicated by dashed line D—D' for example, the timing voltage waveform provided at the grid of tube 32 of multivibrator 12 is recycled. The D.-C. output voltage at the plate of tube 32 would then not be terminated until a time indicated by dashed line F—F', provided no more trigger pulses were received to recycle the system again.

The time that the regulator tube 13 is caused to be ionized by virtue of the negative voltage at the plate of tube 16 should be made sufficient by making the timing of the primary multivibrator 11 long enough so that the charge of capacitor 40 after any recycling trigger pulse is received will be restored back to substantially the same value as that provided at the beginning of a quasi-stable operating state of multivibrator 12 at the time C—C', for example. Otherwise, when regulator tube 13 stops conducting after termination of a negative gating pulse provided at the plate of tube 16 and the capacitor 40 starts recharging through resistor 45, the voltage drop through resistor 45 due to the charging current will not be as large as it was at the beginning of the quasi-stable operating state of multivibrator 12. Thus, the system would not be completely recycled and the non-conducting time for tube 32 from the leading edge of a recycling trigger pulse may not be the same as the non-conducting time which would have been provided by a trigger pulse initiating the quasi-stable operation of secondary multivibrator 12 at a time A—A' or C—C', for example.

In one system embodying the principles of the present invention wherein the positive output pulse provided at the plate of tube 32 has a duration of approximately 5 seconds, it was found that the duration of the narrow gating pulse provided at the plate of tube 16 should be at least of the order of 60 milliseconds to insure that a recycling trigger pulse will cause the secondary multivibrator 12 to be completely recycled. In such a system the time constant of the secondary multivibrator timing circuit comprising resistor 45 and capacitor 40 is approximately one hundred times the time constant of the primary multivibrator timing circuit comprising resistor 27 and capacitor 26.

Any trigger pulse supplied to the grid of tube 14 at any time after cessation of the positive pulse at the plate of tube 16 and during the below cut-off portion of the timing voltage waveform at the grid of tube 32 during quasi-stable operation of multivibrator 12 and stable operation of multivibrator 11 will cause the timing waveform at the grid of tube 32 in the secondary multivibrator 12 to be recycled. Therefore, the positive output voltage at the plate of tube 32 of multivibrator 12 may be continuously maintained for any recurrent trigger pulse series received at the grid of tube 14, provided the pulse repetition time of the trigger pulse series is less than the timing cycle of the secondary multivibrator 12. It should be evident that it makes no difference if the aforementioned repetition time is not constant, nor is required that the trigger pulses be of the same amplitude and/or duration.

Although an output of positive polarity may be derived from the secondary multivibrator 12 at the plate of tube 32, it is obvious that an output of negative polarity could be taken from the plate of tube 31 during the quasi-stable operating state of multivibrator 12. Furthermore, the multivibrators 11 and 12 could be driven by one of more positive pulses supplied to the grid of tube 16 rather than by negative pulses at the grid of tube 14 as has been described.

An alternative embodiment of the present invention is shown in Fig. 3. A monostable multivibrator 11' having the same components as those of multivibrator 11 in Fig. 1 is provided as the first pulse generating means of the alternative system. Upon receiving a negative trigger pulse through coupling capacitor 28', the multivibrator 11' is adapted to provide a negative gating pulse at the plate of tube 16 for causing ionization of a gaseous diode tube 13' similar to the regulator tube 13 disclosed in Fig. 1.

The second pulse generating means of the system shown in Fig. 3 comprises a monostable phantastron circuit 41 including a pentode vacuum tube 42 having a plate load resistor 43 and a grounded cathode resistor 44. A positive source of supply potential comprising a battery 46, for example, is connected to the plate load resistor 43 as indicated. The negative terminal of battery 46 is grounded.

A resistor 47 is coupled between a first control grid 48 of tube 42 and the positive terminal of battery 46. Resistor 47 has a large value of resistance whereby the potential at the control grid 48 is substantially the same as the potential at the cathode of tube 42 during quiescent or stable state operation of circuit 41.

A screen grid 49 of tube 42 is coupled to the positive terminal of battery 46 through two resistors 51 and 52. The junction point between resistors 51 and 52 is coupled to a further grid 53 of tube 42 through a circuit comprising series capacitor 54 and a grounded shunt resistor 56 of large resistance value of the order of that of resistor 47.

A timing capacitor 57 is coupled between the plate and control grid 48 of tube 42. The grid 48 is also coupled to the plate of the diode regulator tube 13', the cathode of tube 13' being coupled to the output of multivibrator 11' in the same manner as in Fig. 1.

During quiescent or stable state operation of the phantastron circuit 41 most of the current in tube 42 flows to the screen grid 49, the potential between the grid 53 and the cathode of tube 42 being negative and of a large enough magnitude to impede current flow to the plate, grid 53 being at ground potential. At this time the potential at the junction between the capacitor 54 and the resistors 51–52 is positive, but well below the potential of battery 46 since screen grid 49 current is at a maximum value. The potential at the cathode of tube 42 is at a positive value above ground due to tube current flow through resistor 44.

Control grid 48 current flow during quiescent operation of tube 42 causes the potential at the plate of the diode regulator tube 13' to be insufficiently positive to cause ionization of tube 13' as long as the cathode potential of tube 13' is substantially zero with reference to ground. Such a condition is realized since the cathode of tube 13' is coupled to a ground potential point in multivibrator 11' during stable operation thereof.

When the multivibrator 11' provides a negative gating output voltage in response to a negative trigger pulse supplied to the input thereof through capacitor 28', the difference in potential between the plate and cathode of diode regulator tube 13' is sufficient to cause ionization of tube 13' and a change in the charge of capacitor 57 from its quiescent value. At this time the voltage at the grid 48 of tube 42 is driven in a negative direction, thus reducing current flow in tube 42 and the voltage at the cathode thereof to a very small positive value, thereby causing the phantastron circuit 41 to be operated in a quasi-stable state.

The reduction in the cathode voltage of tube 42 causes current to be diverted from the screen grid 49 to the plate of tube 42 since the negative voltage between grid 53 and the cathode of tube 42 is reduced. As this occurs the voltage at the junction between resistors 51 and 52 rises abruptly, this voltage increase being coupled to the grid 53 to further increase the flow of current to the plate of tube 42 and decrease the flow of screen grid 49 current. Thus a positive going voltage pulse is initiated at an output terminal connected to the junction between resistors 51 and 52 which has a magnitude substantially as large as the potential of battery 46 since substantially no screen grid 49 current flows.

When the negative output gating pulse provided by multivibrator 11' ceases and the tube 13' is deionized as in Fig. 1, capacitor 57 begins to recharge through resistor 47 to the difference between the voltage of battery 46 and the plate voltage of tube 42 when plate current flows. During this time the voltage at grid 48 rises along a slope from the negative value attained when tube 13' is ionized. Thus, more current flows in tube 42 and the cathode voltage of tube 42 is increased. At the same time the capacitor 54 is charging through resistor 56 so that the voltage at grid 53 is decreasing. A certain point is reached where the plate current is again cut off by a large negative voltage between grid 53 and the cathode. As a result screen grid 49 current flows providing an abrupt decrease in the voltage at the junction between resistors 51 and 52 back to the quiescent value thereof. Thus the positive voltage pulse at a point between resistors 51 and 52 which occurs upon receipt of the input trigger pulse to multivibrator 11' is terminated.

If a negative recycling trigger pulse is provided at the input of multivibrator 11' before termination of the positive output pulse at the terminal connected to the junction between resistors 51 and 52, tube 13' will become ionized and capacitor 57 will become fully charged as before. As in the circuit of Fig. 1 the duration of the output pulse provided by the multivibrator 11' should be sufficient to insure that the tube 13' is ionized for a sufficient time so that the charge of capacitor 57 will be restored back to substantially the same value as that provided at the beginning of a quasi-stable operating state of the phantastron circuit 41. Thus the timing voltage waveform at the grid 48 of tube 42 will be completely recycled so that an output pulse of constant duration from the leading edge of each negative trigger pulse at the input to multivibrator 11' is always provided at the output of phantastron circuit 41.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pulse timing system, comprising first electronic pulse generating means having a stable operating state and a quasi-stable operating state of first duration, second electronic pulse generating means having a stable operating state and a quasi-stable operating state of second duration appreciably longer than said first duration, each of said pulse generating means having a timing circuit for regulating the quasi-stable operation times thereof, the timing circuit of said second pulse generating means comprising a resistor and a capacitor coupled together to provide a timing voltage waveform therefor, means coupling an output of said first generating means into the timing circuit of said second generating means, said coupling means comprising a gaseous diode unidirectional conducting means coupled to said first generating means and a junction between said resistor and capacitor of the timing circuit of said second generating means, said diode being adapted to be non-conductive during stable state operation of said first generating means for effectively isolating said first and second pulse generating means during stable state operation of said first generating means, and means for applying a trigger pulse of predetermined polarity to said first generating means for changing the operation of said first generating means from said stable to said quasi-stable operating state, said coupling means being responsive during the quasi-stable operating state of said first generating means to an output voltage pulse provided by said first pulse generating means for conduction of said diode and triggering of said second pulse generating means into quasi-stable state operation.

2. A pulse timing system, comprising first electronic pulse generating means having a stable operating state and a quasi-stable operating state of first duration, said first generating means having an output load, second electronic pulse generating means having a stable operating state and a quasi-stable operating state of second duration appreciably longer than said first duration, each of said pulse generating means having a timing circuit for regulating the quasi-stable operating times thereof, the timing circuit of said second generating means including a timing capacitor having a quiescent charge of a first value, coupling means including a gaseous diode discharge tube having one electrode connected to said load and a further electrode connected to said timing capacitor, said coupling means being adapted to provide a substantially infinite impedance between said first and second pulse generating means for periods corresponding with periods of stable state operation of said first generating means, means for applying a trigger pulse of predetermined polarity to said first generating means for changing its operation from a stable to a quasi-stable operating state thereby providing a quasi-stable voltage across said output load, said coupling means being responsive to said voltage for providing a low impedance discharging path through said discharge tube for changing the charge upon said timing capacitor to a second value substantially different from said first value, said second pulse generating means including a path for recharging said capacitor back to said quiescent charge of said first value during a stable operating state of said first generating means.

3. An electronic timing circuit, comprising a monostable pulse generator having stable and quasi-stable operating states, said generator comprising means for providing a quasi-stable output voltage of predetermined polarity and duration in response to an input trigger voltage supplied thereto, a monostable multivibrator having stable and quasi-stable operating states, said multivibrator including a timing circuit for providing a timing voltage waveform for regulating the duration of said quasi-stable operating state thereof, and unidirectional coupling means comprising a gaseous diode tube having one side connected to the timing circuit of said multivibrator and another side connected to said pulse generator for receiving said output voltage of said pulse generator, said gaseous diode tube being adapted to be non-conductive coextensively with stable operation and conductive coextensively with quasi-stable operation of said pulse generator.

4. An electronic timing circuit as set forth in claim 3, wherein said pulse generator comprises a further multivibrator including first and second vacuum tubes, said first vacuum tube being non-conductive and said second vacuum tube being conductive during quasi-stable state operation of said further multivibrator, the plate of said second vacuum tube being connected to the cathode of said diode tube.

5. An electronic pulse timing system, comprising a first pulse generator having an output circuit for providing a gating voltage in response to an input trigger pulse supplied to said generator, said first generator including a resistor-capacitor timing circuit for regulating the duration of said gating voltage, a second pulse generator including a resistor-capacitor timing circuit, the time constant of the timing circuit of said second pulse generator being appreciably longer than the time constant of the timing circuit of said first pulse generator, said second pulse generator being adapted to provide a pulse output voltage in response to a timing voltage waveform provided in the timing circuit thereof, and unidirectional coupling means comprising a gaseous diode regulator tube connected from the output circuit of said first generator into the timing circuit of said second generator, said unidirectional coupling means being adapted to be non-conductive in the absence of said gating voltage and conductive during the presence of said gating voltage at the output circuit of said first pulse generator.

6. An electronic pulse timing system as set forth in claim 5, wherein said second pulse generator comprises a monostable multivibrator.

7. An electronic pulse timing system as set forth in claim 6, wherein said first pulse generator comprises a monostable multivibrator.

8. An electronic pulse timing system, comprising a timing circuit including a resistor and a capacitor having a predetermined time constant, means for charging said capacitor to a predetermined constant voltage, pulse generator means having stable and quasi-stable operating states, said generating means including an input circuit responsive to a trigger pulse of predetermined polarity to change said generating means from its stable to its quasi-stable operating state, said generating means having an output circuit for providing a first voltage during its stable operating state and a second voltage during its quasi-stable operating state, and unidirectional coupling means comprising a gaseous regulator tube connected from the output circuit of said generating means into said timing circuit, a first voltage at the output of said generating means during one of its operating states maintaining said unidirectional coupling means non-conducting to isolate said generator means from said timing circuit, a second voltage at the output of said generating means during the other of its operating states providing for conduction of said unidirectional coupling means for changing the voltage charge of said capacitor in said timing circuit, said generating means including timing means for rendering the duration of said second voltage provided during the other of its operating states of appreciably smaller value than the value of the time constant for said timing circuit.

9. An electronic pulse timing system, comprising a first monostable pulse generating means having a quasi-stable operating state of first duration, a second monostable pulse generating means having a quasi-stable operating state of second duration appreciably longer than said first duration, said first pulse generating means having an output load, said second pulse generating means having a resistor-capacitor timing circuit for regulating the duration of the quasi-stable operating state of said second pulse generating means, and unidirectional coupling means having one end connected to said load and another end connected to the junction of said resistor and said capacitor of said timing circuit for providing a discharge path for said capacitor during a conductive condition for said coupling means, said first and second pulse generating means being adapted to provide a predetermined voltage across said unidirectional coupling means for maintaining said coupling means in a non-conductive condition coextensively with the stable operating state of said first pulse generating means, said first pulse generating means being adapted to provide a predetermined output voltage across said load during quasi-stable state operation of said first pulse generating means to thereby change the voltage across said coupling means so that said coupling means becomes conductive for triggering said second pulse generating means for operation in its quasi-stable operating state.

10. A pulse timing system as set forth in claim 9, wherein said second pulse generating means comprises a monstable phantastron circuit.

11. An electronic pulse timing system, comprising a first monostable multivibrator having a first quasi-stable operating time, a second monostable multivibrator having a second quasi-stable operating time, said first multivibrator having an output load, said second multivibrator having a resistor-capacitor timing circuit, and unidirectional coupling means having one end connected to said load and another end connected to the junction of said resistor and capacitor of said timing circuit, said first and second multivibrators being adapted to provide a predetermined voltage across said unidirectional coupling means for maintaining said coupling means in a non-conductive condition coextensively with the stable operating state of said first multivibrator, said first multivibrator being adapted to provide a predetermined output voltage of proper polarity and magnitude during quasi-stable state operation thereof to thereby change the voltage across said coupling means so that said coupling means becomes conductive for triggering said second multivibrator into a quasi-stable operating state.

12. An electronic pulse timing system as set forth in claim 11, wherein said unidirectional coupling means comprises a gaseous regulator tube.

13. An electronic pulse timing system as set forth in claim 12 wherein said first multivibrator includes a first grid-controlled discharge device which is normally cut-off during stable state operation of said first multivibrator, said second multivibrator including a second grid-controlled discharge device which is normally conducting during stable state operation of said second multivibrator, said regulator tube being connected between the grid of said second discharge device and the output of said first discharge device.

References Cited in the file of this patent

UNITED STATES PATENTS

| | | |
|---|---|---|
| 2,427,533 | Overbeck | Sept. 16, 1947 |
| 2,525,634 | Atwood et al. | Oct. 10, 1950 |
| 2,526,551 | Gano | Oct. 17, 1950 |
| 2,536,808 | Higinbotham | Jan. 2, 1951 |
| 2,572,891 | Smith | Oct. 30, 1951 |
| 2,653,237 | Johnstone | Sept. 22, 1953 |
| 2,747,111 | Koch | May 22, 1956 |